(12) United States Patent
Lea

(10) Patent No.: US 10,499,125 B2
(45) Date of Patent: Dec. 3, 2019

(54) TASA: A TDM ASA-BASED OPTICAL PACKET SWITCH

(71) Applicant: Chin-Tau Lea, Mid Level (HK)

(72) Inventor: Chin-Tau Lea, Mid Level (HK)

( * ) Notice: Subject to any disclaimer, the term of this patent is extended or adjusted under 35 U.S.C. 154(b) by 0 days.

(21) Appl. No.: 15/530,216

(22) Filed: Dec. 14, 2016

(65) Prior Publication Data

US 2018/0167702 A1    Jun. 14, 2018

(51) Int. Cl.
*H04J 14/02* (2006.01)
*H04Q 11/00* (2006.01)

(52) U.S. Cl.
CPC ......... *H04Q 11/0005* (2013.01); *H04Q 11/00* (2013.01); *H04J 14/02* (2013.01); *H04Q 2011/0022* (2013.01)

(58) Field of Classification Search
CPC ....... H04Q 11/0005; H04Q 2011/0022; H04Q 11/00; H04J 14/02
USPC .................................................. 398/43–103
See application file for complete search history.

(56) References Cited

U.S. PATENT DOCUMENTS

| | | | | |
|---|---|---|---|---|
| 6,288,808 B1 * | 9/2001 | Lee | ..................... | H04J 14/0223 398/49 |
| 6,829,401 B2 * | 12/2004 | Duelk | ................ | H04Q 11/0005 385/16 |
| 7,058,062 B2 * | 6/2006 | Tanabe | ................ | H04L 12/5601 370/395.2 |
| 7,110,394 B1 * | 9/2006 | Chamdani | ............... | H04L 49/15 370/355 |
| 7,151,774 B1 * | 12/2006 | Williams | ............ | H04L 12/4625 370/392 |
| 7,212,524 B1 * | 5/2007 | Sailor | ...................... | H04Q 3/68 370/370 |
| 7,430,346 B2 | 9/2008 | Jennen | | |
| 7,453,800 B2 * | 11/2008 | Takajitsuko | ............ | H04L 49/30 370/230 |
| 7,693,142 B2 * | 4/2010 | Beshai | ................... | H04L 45/60 370/380 |
| 8,315,522 B2 * | 11/2012 | Urino | ...................... | H04J 14/02 398/68 |

(Continued)

FOREIGN PATENT DOCUMENTS

EP    1 162 860 A2    12/2001

OTHER PUBLICATIONS

Lea, A Scalable AWGR Based Optical Switch, Nov. 2015, IEEE, Pages All Document.*

(Continued)

*Primary Examiner* — Dibson J Sanchez

(57) ABSTRACT

A scalable AWGR-based optical packet switch, called TASA (short for TDM ASA), is presented in this invention. The switch is a modified version of the ASA switch but does not have its drawbacks. The total port count is $N^2$ and each port can transmit up to N packets of different wavelengths simultaneously. This makes the total capacity of the switch close to ($N^3$×bandwidth of one wavelength channel).

But a TASA switch differs from an ASA switch in two major ways. First, a TASA switch does not need an electronic scheduler. This removes a potential bottleneck in the design of an optical packet switch. Second, it can handle any kind of unbalanced loads and can tolerate faults. These qualities, however, are missing in an ASA switch.

2 Claims, 14 Drawing Sheets

(56) References Cited

U.S. PATENT DOCUMENTS

| | | | | |
|---|---|---|---|---|
| 8,705,500 B1* | 4/2014 | Aybay | ............... | H04L 49/45 |
| | | | | 370/338 |
| 8,792,787 B1 | 7/2014 | Zhao | | |
| 9,401,774 B1* | 7/2016 | Mineo | ............ | H04Q 11/0005 |
| 9,497,517 B2 | 11/2016 | Lea | | |
| 2002/0024951 A1* | 2/2002 | Li | ............... | H04L 45/00 |
| | | | | 370/392 |
| 2002/0039362 A1* | 4/2002 | Fisher | ............ | H04Q 3/68 |
| | | | | 370/387 |
| 2002/0075883 A1* | 6/2002 | Dell | ............ | H04L 49/1576 |
| | | | | 370/413 |
| 2002/0085578 A1* | 7/2002 | Dell | ............ | H04Q 11/0478 |
| | | | | 370/422 |
| 2003/0081548 A1* | 5/2003 | Langevin | ......... | H04L 49/254 |
| | | | | 370/230 |
| 2003/0193937 A1* | 10/2003 | Beshai | ........... | H04Q 11/0005 |
| | | | | 370/372 |
| 2004/0165818 A1* | 8/2004 | Oikawa | ........... | H04Q 11/0005 |
| | | | | 385/24 |
| 2006/0165070 A1* | 7/2006 | Hall | ............ | H04L 49/101 |
| | | | | 370/369 |
| 2006/0168380 A1* | 7/2006 | Benner | ........... | H04L 49/101 |
| | | | | 710/110 |
| 2007/0030845 A1* | 2/2007 | Hill | ............ | H04L 49/253 |
| | | | | 370/369 |
| 2007/0092248 A1* | 4/2007 | Jennen | ........... | H04J 14/021 |
| | | | | 398/45 |
| 2008/0159145 A1* | 7/2008 | Muthukrishnan | ... | H04L 49/1523 |
| | | | | 370/235 |
| 2008/0267204 A1* | 10/2008 | Hall | ............ | H04L 47/125 |
| | | | | 370/412 |
| 2008/0285449 A1* | 11/2008 | Larsson | ............ | H04L 49/1515 |
| | | | | 370/232 |
| 2009/0003827 A1* | 1/2009 | Kai | ............... | H04J 14/0227 |
| | | | | 398/45 |
| 2009/0028140 A1* | 1/2009 | Higuchi | ............ | H04L 49/1546 |
| | | | | 370/388 |
| 2009/0080895 A1* | 3/2009 | Zarris | ............ | H04J 14/02 |
| | | | | 398/98 |
| 2009/0175281 A1* | 7/2009 | Higuchi | ............ | H04L 49/1523 |
| | | | | 370/401 |
| 2009/0324243 A1* | 12/2009 | Neilson | ............ | H04Q 11/0005 |
| | | | | 398/154 |
| 2012/0243868 A1* | 9/2012 | Meyer | ............ | H04Q 11/0005 |
| | | | | 398/46 |
| 2013/0083793 A1* | 4/2013 | Lea | ............ | H04L 49/1515 |
| | | | | 370/388 |
| 2013/0121695 A1 | 5/2013 | Bernasconi | | |
| 2013/0266309 A1* | 10/2013 | Binkert | ............ | H04L 49/253 |
| | | | | 398/19 |
| 2014/0255022 A1* | 9/2014 | Zhong | ............ | H04Q 11/0005 |
| | | | | 398/16 |
| 2015/0104171 A1* | 4/2015 | Hu | ............ | H04Q 11/0066 |
| | | | | 398/48 |
| 2015/0289035 A1* | 10/2015 | Mehrvar | ............ | H04L 49/356 |
| | | | | 398/51 |

OTHER PUBLICATIONS

Aly et al, Simulation of Fast Packet Switched Photonic Networks for Interprocessor Communication, Apr. 1991, IEEE, Pages All Document.*

* cited by examiner

TASA: A TDM ASA-BASED OPTICAL PACKET SWITCH

TECHNICAL FIELD

The invention relates generally to the design of optical packet switches and methods, and in particular, scalable AWGR-based optical packet switching systems.

BACKGROUND

The energy-per-bit efficiency has become the ultimate capacity limiting factor for future routers and data center networks. People have turned to optics for solution. If the switching can be done optically, the E/O and O/E conversions inside the switch will disappear and tremendous power saving can be achieved. As optical switching devices, AWGRs (Arrayed Wavelength Grating Router) have many advantages. They are passive and consume little or no power. They allow WDM signals and have high per-port capacity. The only problem is that they are limited in size. How to design an AWGR-based scalable switch is an important issue for future datacenters and routers.

One such design is the ASA switch architecture presented in U.S. Pat. No. 9,497,517 and in the paper C-T Lea, "*A Scalable AWGR-Based Optical Switch,*" IEEE Journal on Lightwave Technology, Vol 33, No 22, November 2015, pp. 4612-4621. This architecture contains an optical switching fabric plus an electronic scheduler. The optical switching fabric consists of three switching stages: AWGRs (Arrayed Wavelength Grating Router), space switches, and AWGRs. It is named ASA for the technologies used in the three stages. The sizes of the AWGRs and the optical space switches used in the architecture are N×N and there are up to N AWGRs in the first and the third stages. This makes the maximum port number in the ASA architecture $N^2$. Each port can send up to N packets of different wavelengths simultaneously. The total capacity of the switch is close to ($N^3$×bandwidth of each wavelength channel).

Although the ASA switch architecture can expand the port count from N to $N^2$, it has two limitations. (a) It still needs an electronic scheduler to coordinate transmissions from all ports. This can be a potential bottleneck. (ii) It performs poorly under certain traffic patterns. In this patent, a modified version of the ASA architecture is presented to fix these problems. The new switch does not need an electronic scheduler and performs equally well under any traffic load.

SUMMARY

The following discloses a summary of the invention of a scalable optical AWGR-based packet switch that does not need an electronic scheduler. The new switch is called TASA (short for TDM ASA) which is a modified version of the ASA switch described in U.S. Pat. No. 9,497,517. A TASA switch has an optical switch fabric, but without an electronic scheduler. The optical switch fabric is similar that used in an ASA switch and consists of three stages: the first-stage and the third-stage portions of the switching fabric comprise a plurality of N×N (N inputs and N outputs) AWGRs (arrayed waveguide grating routers), which are interconnected by a middle stage of N optical space switches of size N×N, where N is an odd integer.

But a TASA switch differs from an ASA switch fabric in one major way: It does not need an electronic scheduler. The optical space switches of a TASA switch operate in a TDM (time division multiplexing) mode with a fixed predetermined connection pattern. This means that the TASA switch does not require an electronic scheduler to coordinate the transmissions from external ports. Which VOQs (virtual output queues) can be activated by a port can be easily determined from the TDM patterns used by the optical space switches in the TASA switch. This removes a potential bottleneck in the ASA architecture.

Using two TASA switches cascaded in tandem, we create a new optical packet switch that has a steady performance under any traffic pattern. The first TASA switch creates an evenly distributed traffic pattern for the second TASA switch. The entire switch is also fault tolerant, while an ASA switch cannot tolerate any failure.

DETAILED DESCRIPTION

The subject innovation presents architectures and methods relating to the construction of scalable all-optical AWGR-based packet switches that do not require electronic schedulers. A switching fabric (e.g 121) provides the interconnection function between a plurality of input ports (e.g. 141A) and a plurality of output ports (e.g. 151A). An input port usually divides ('chops') an incoming data packet into fixed-length cells before they are sent to the switching fabric. The time for transmitting a cell is called a slot. The various exemplary embodiments of the invention presented herein operate in a 'cell mode' (i.e., all data packets being transmitted through the switching fabric have the same packet length), while the terms 'packet' and 'cell' are used interchangeably herein.

Power consumption is becoming the ultimate bottleneck in the design of a router or a data center network. People have turned to optics for solutions. Switching a signal in the optical domain consumes significantly less power than switching a signal in the electronic domain. But to fully utilize optics' potential of reducing the physical and carbon footprint of a router or a data center network, we must exploit its WDM capability because WDM can increase the overall capacity by thirty or forty times with little additional cost or power consumption. AWGRs (Arrayed Wavelength Grating Routers) provide the most promising solution in this regard.

An N-port AWGR (e.g. 200) operates on a set of N wavelengths $(\lambda_0, \lambda_1, \ldots, \lambda_{N-1})$. A flow in such a device can be categorized by a three-tuple (i,w,o), where i denotes the input, w the wavelength used by the flow, and o the output. The relationship among the three parameters in (i,w,o) is given below:

$$o=(i+w)\bmod N. \quad (1)$$

From (1) we can see that given any two of the three parameters, the other parameter can be determined automatically. Thus in total there are only $N^2$ flows that can be defined in an N×N AWGR device. Each input can transmit N flows in a given slot and $N^2$ flows in total can traverse the device simultaneously without blocking each other.

Although AWGRs have become the center piece of many proposed optical switches, this technology has one fundamental limitation: poor scalability. Right now, the number of port count of a commercially available AWGR is around 50, but a future datacenter may need a switch with more than a thousand ports.

TASA Pakcet Switch

The ASA switch architecture presented in U.S. Pat. No. 9,497,517 is an AWGR-based optical switch. It can expand port count from N to $N^2$, where N is the port count of an AWGR device. Its design principle is based on the two-stage network 300 shown in FIG. 3, which is a cascade of two AWGRs (i.e 340 and 350). Each flow in the two-stage network is still characterized by a three-tuple (i,w,o). The relationship among the three parameters is now governed by $$o=(i+2w)\bmod N \quad (2)$$

Figure 3:
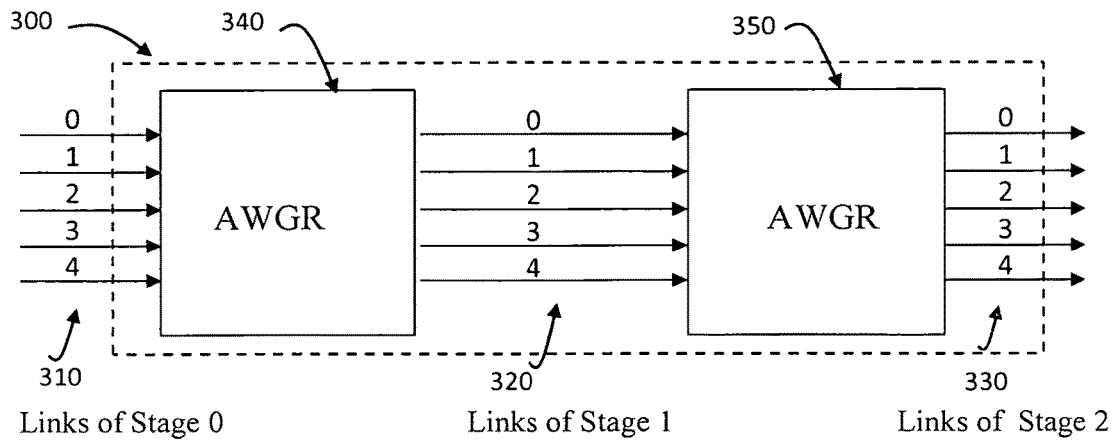
FIG. 3 is a two-stage AWGR-based switch fabric, where N, the number of wavelengths of the AWGR, is an odd integer.

Note that in this two-stage network, N must be odd in order to support $N^2$ flows simultaneously. The two-stage network also has the property that given any two parameters in the three-tuple (i,w,o) of a flow, the other parameter can be uniquely determined. The flows passing through a link of link stage 1 (i.e. 320) in FIG. 3 are given below.

Links of Stage 1:
line 0 (0, 0, 0) (4, 1, 1) (3, 2, 2) (2, 3, 3) (1, 4, 0)
line 1 (1, 0, 1) (0, 1, 2) (4, 2, 3) (3, 3, 4) (2, 4, 0)
line 2 (2, 0, 2) (1, 1, 3) (0, 2, 4) (4, 3, 0) (3, 4, 1)
line 3 (3, 0, 3) (2, 1, 4) (1, 2, 0) (0, 3, 1) (4, 4, 2)
line 4 (4, 0, 4) (3, 1, 0) (2, 2, 1) (1, 3, 2) (0, 4, 3)

Figure 4:
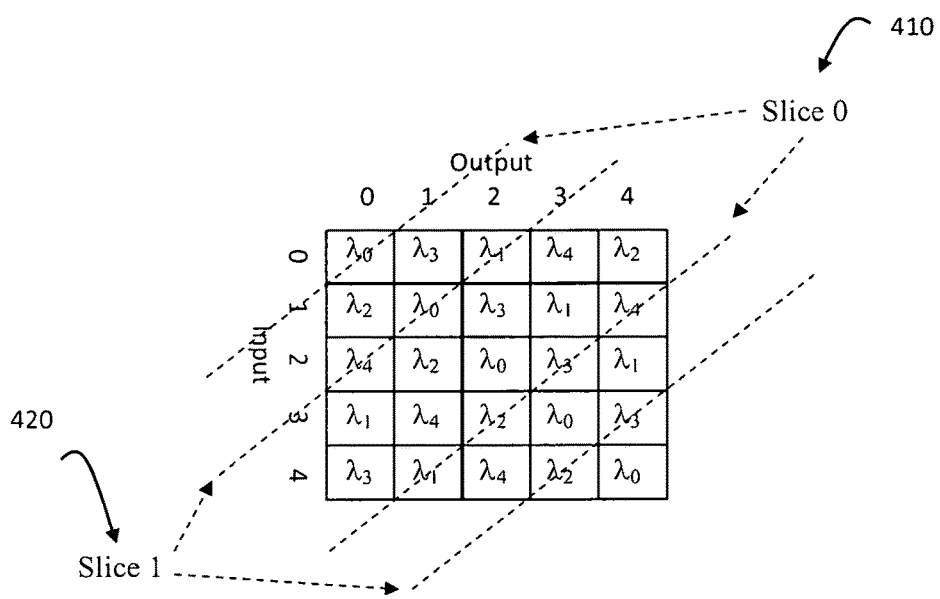
FIG. 4 is a diagram to illustrate the concept of a slice of flows.

The flows of each row are called a slice in the description below. All $N^2$ flows are divided into N slices, numbered from 0 to N−1 (e.g. slice 0 identified by 410 in FIG. 4). Given i and w of a flow, we can compute its slice number sn as follows:

$$sn=(i+w)\bmod N. \quad (3)$$

Similarly given i and o of a flow, we can also determine the slice number of the flow from (2-3). The shaded numbers above represent the wavelength of a flow. They can be computed from the other two parameters.

(A) ASA Switch Fabric

Figure 5:
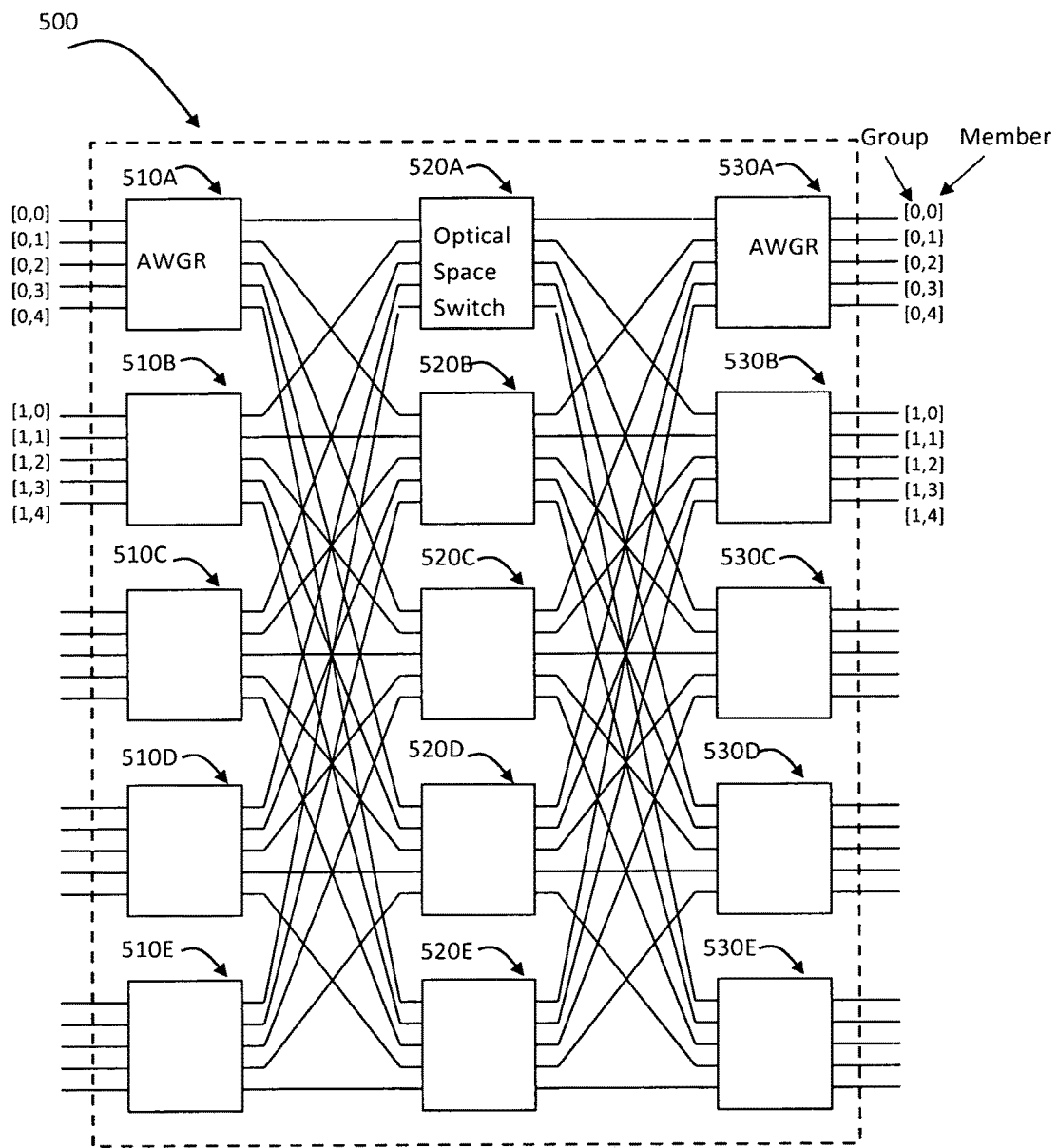
FIG. 5 is an exemplary embodiment of a TASA switch fabric. It is similar to that of an ASA switch fabric. The first and the third stage are constructed with N N×N AWGRs and the middle-stage with N N×N optical space switches, where N is an odd integer. The TASA fabric, however, does not need an electronic scheduler.

The two-stage network in FIG. 3 lays the foundation of the three-stage fabric of the ASA switch. FIG. 5 depicts an embodiment of a 3-stage ASA switching fabric (i.e. 500). There are N N×N AWGRs in the first (i.e. 510 A-E) and the third stage (i.e. 530A-E), and N N×N (N must be odd) optical space switches in the middle stage (e.g. 520A-E). MEMS devices or $LiNbO_3$-based directional couplers can be used to implement the optical space switches.

The address of an input (or output) in an ASA switch is specified by a two-tuple [group, member], where group refers to the AWGR number and member refers to the link of the AWGR to which the input (output) is attached (see FIG. 5). We can still use the member field to define the slice of a flow in an ASA switch. In other words, for flow ($[g_s, m_s]$, *, $[g_d, m_d]$), we can use $m_s$, $m_d$, and (2-3) to compute the slice number of the flow and the wavelength to be used for the flow:

$$m_d=(m_s+2w)\bmod N$$

$$sn=(m_s+w)\bmod N.$$

Under this definition, $g_s$ and $g_d$ represent the originating and destination AWGR of the flow.

The topology of the ASA architecture dictates that flows of all ith-slices are sent to the ith optical space switch. For example, in the two stage network of FIG. 3, flow (4, *, 1) belongs to the $0^{th}$ slice, meaning it leaves from the $0^{th}$ output link of the first AWGR in stage 1 and arrives at the $0^{th}$ input link of the second AWGR in stage 2. In an ASA switch, ($[g_s, 4]$, *, $[g_d, 1]$) is also a flow of the $0^{th}$-slice. It leaves AWGR $g_s$ of stage 1 from its $0^{th}$ output link, and arrives at the AWGR $g_d$ in stage 3 from its $0^{th}$ input link. This flow is sent to the $0^{th}$ optical space switch. A connection between $g_s$ and $g_d$ must be set up through the $0^{th}$ optical space switch to allow this flow to pass through.

Figure 1:
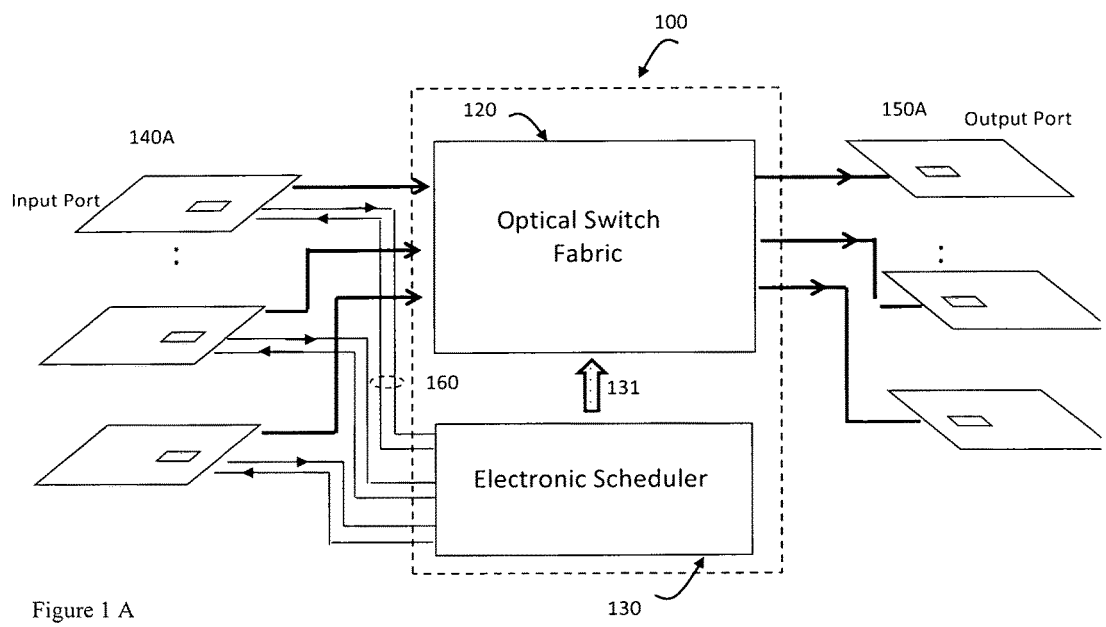
FIG. 1A is an exemplary optical switch with an optical switch fabric and an electronic scheduler.
FIG. 1B is an exemplary optical switch which does not need an electronic scheduler.
Figure 1B:
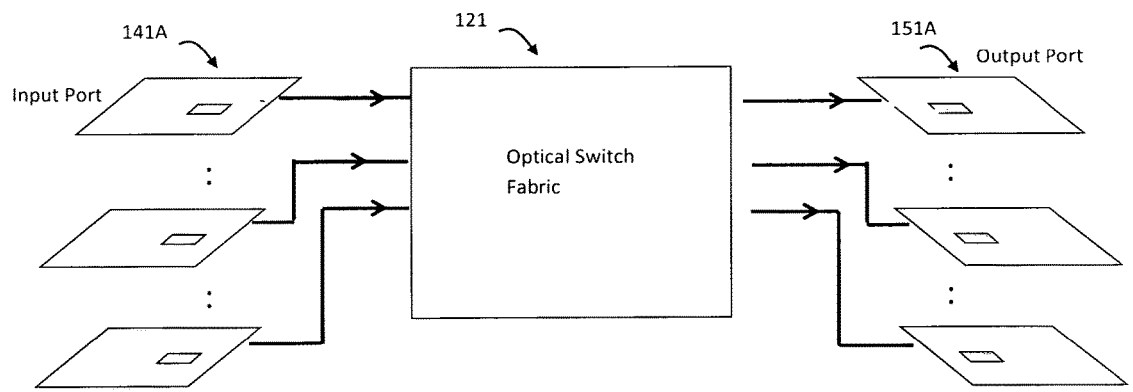
Figure 2:
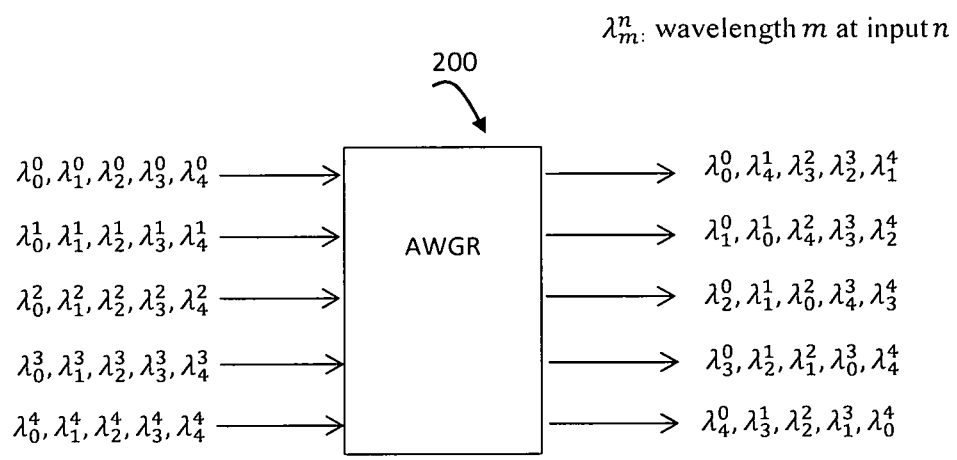
FIG. 2 is diagram illustrating $N^2$ flows which can pass through an N×N AWGR.

Since the traffic pattern can change from slot to slot, an electronic scheduler, such as 130 in FIG. 1, is required to schedule the transmissions from different input ports and to configure the optical space switches of the middle stage in each slot. The scheduling is carried out based on the requests sent by input ports to the scheduler. Grants will be sent back by the scheduler for each slot after scheduling is performed. Request and grants are sent through a separate fiber. This means that each port must have two pair of optical fibers: one for the optical switch fabric and one for the electronic scheduler. The electronic scheduler in the ASA architecture consists of two stage of scheduling devices. The complexity of the scheduler is quite high. The scheduling algorithm used inside the scheduler can also become a potential bottleneck.

The ASA architecture has another problem. When traffic is uneven, the performance of an ASA switch may be poor. This is because when N transmitters of an input port are used simultaneously, the transmitted packets must be destined for different output ports. If all traffic from an input port is destined for an output port, the throughput of the switch is only 1/N the throughput of the switch under an evenly distributed traffic.

(B) TASA Switch Fabric

Figure 6:
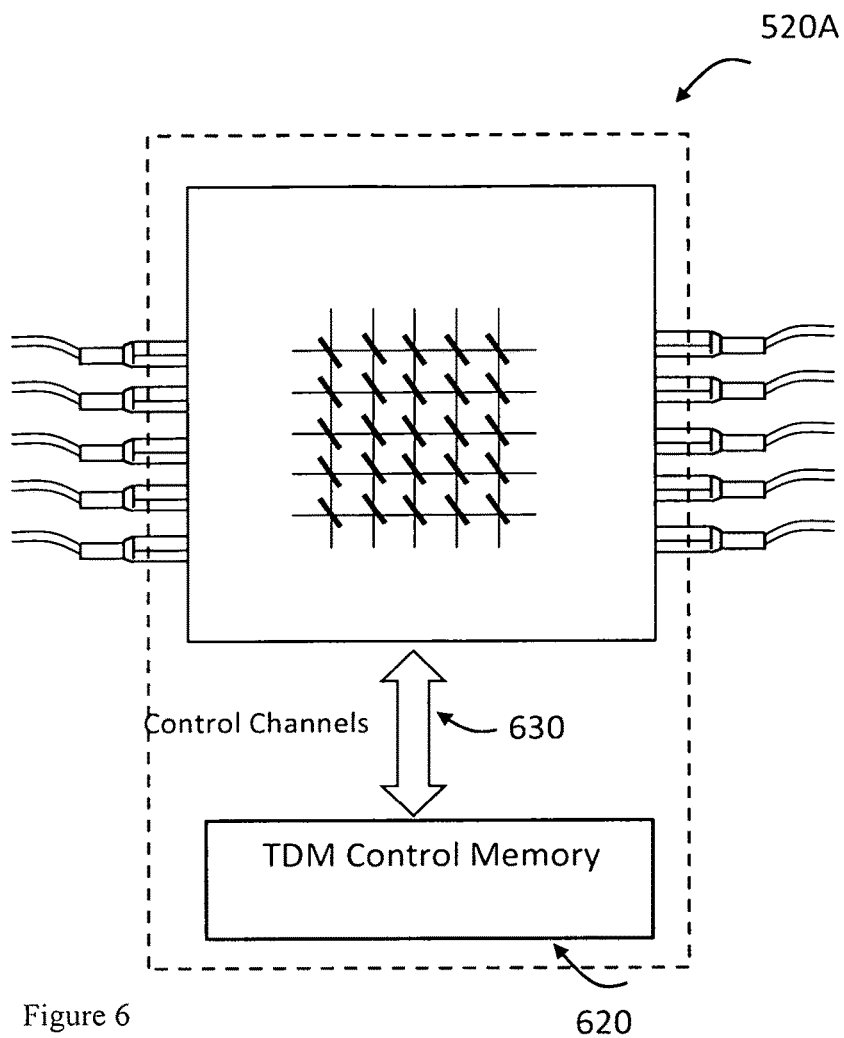
FIG. 6 illustrates the TDM controller to control an optical space switch in a TASA switch.
Figure 7:
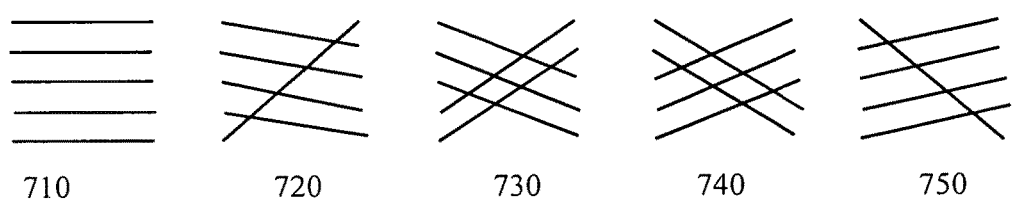
FIG. 7 is an exemplary implementation of TDM connection patterns in a 5×5 optical space switch. These patterns will be repeated every 5 slots.

The TASA switching fabric presented in FIG. 6 does not need an electronic scheduler to schedule packet transmissions. Instead, all middle-stage optical space switches are self-controlled and operate on a TDM (time division multiplexing) mode with a fixed predetermined connection pattern in each slot. This optical switching architecture is thus named TASA (short for TDM ASA). The TDM connection pattern of each slot is stored in the TDM Control Memory 620. An exemplary pattern of a given slot is shown in 700-740. These connection patterns repeat after N slots (N=5 in FIG. 7). Note that in our design, all optical space switches of the middle stage use the same pattern in a given slot. The result is that for a given slot, all outputs of an AWGR in stage 1 are connected to the inputs of only one AWGR in stage 3. Thus FIG. 7 also represents how an AWGR in stage 1 is connected to another AWGR in stage 3 (see 710-750 and FIG. 9A-E). For example in slot 1, the first AWGR of stage 1 will be connected to the second AWGR of stage 3 (see 701).

To use a TDM space switch for packet switching, two conditions must be met: (i) traffic is evenly distributed and (ii) the switch size is not too big. Since the size of an optical space switch in the TASA architecture is only N (the total port count is $N^2$), the second requirement is met automatically. A method describe below will make the traffic pattern of a TASA switch fabric evenly distributed even if the original traffic pattern is not.

Figure 8A:
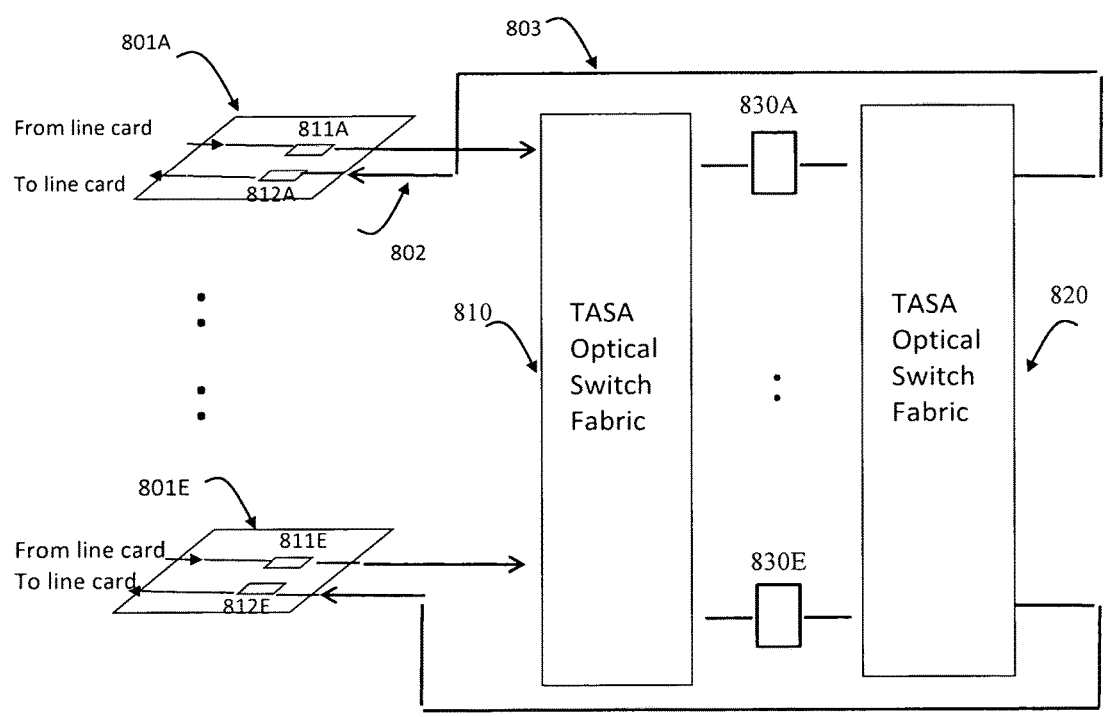
FIG. 8A illustrates an optical switch containing two TASA optical switch fabrics cascaded in tandem. The first switch fabric is used to create an evenly distributed traffic pattern and the second switch fabric routes packets to their original destinations.

FIG. 8A shows a switch comprising two TASA switch fabrics cascaded in tandem and a stage of intermediate port processors between the two TASA fabrics. Although input ports and output ports in FIG. 1 are shown separately, in practice they are collocated on the same board (e.g. input port 811A and output port 812 A, input port 811E and output port 812E). In FIG. 8A, an input port sends an incoming packet to a randomly selected intermediate port (e.g. 830A, 830E) regardless of the original destination. Since the intermediate port is randomly chosen, the traffic pattern to the first TASA switch can be considered evenly distributed. Furthermore, this also makes the traffic pattern entering the second TASA switch fabric evenly distributed. Therefore, the first requirement for using TDM space switches can be met in both TASA fabrics in FIG. 8A.

Figure 8B:
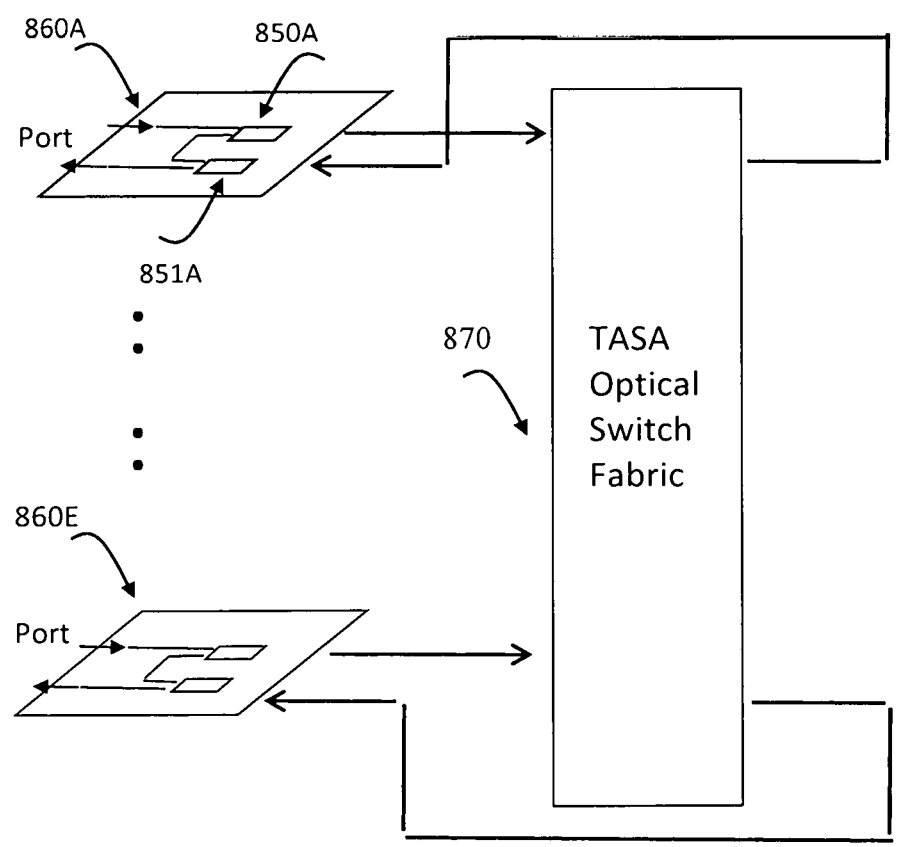
FIG. 8B illustrates another implementation of a TASA-based switching system. This implementation uses only one TASA switch fabric. Each packet needs to pass through the TASA switch fabric twice.
Figure 9A:
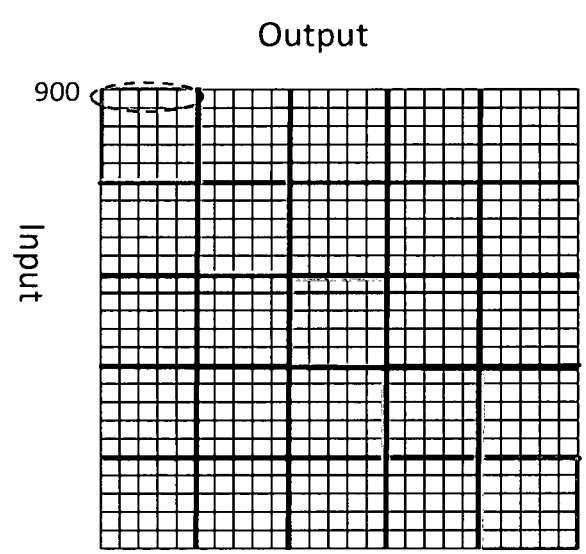
FIGS. 9 A-E show that corresponding VOQs that will be activated for transmissions in a given slot based on the fixed TDM connection patterns given in FIG. 7.
Figure 9B:
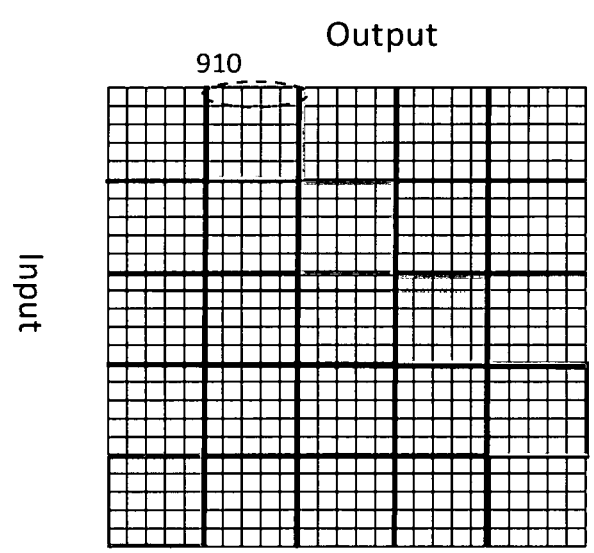
Figure 9C:
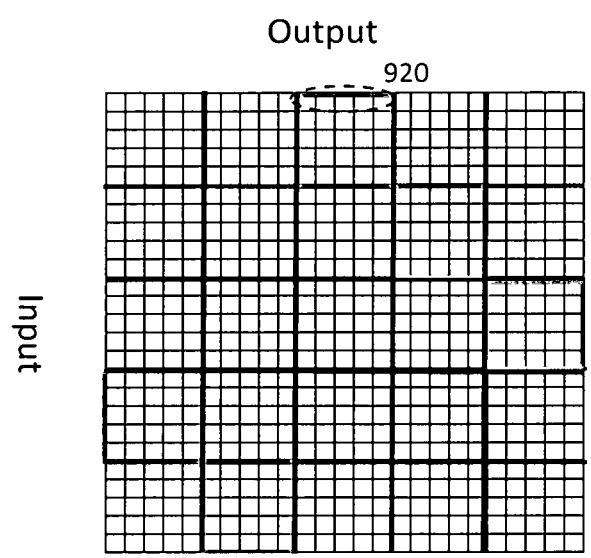
Figure 9D:
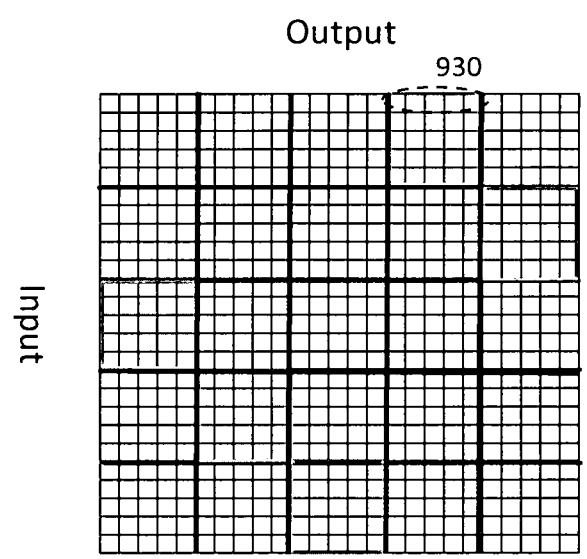
Figure 9E:
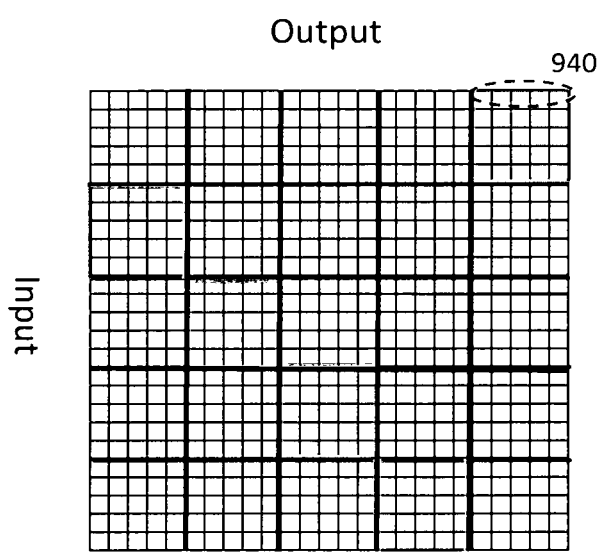

FIG. 8B shows another implementation of the same idea with just one TASA switch fabric. Each packet in FIG. 8B will pass through the TASA switch fabric 870 twice. In the first round, an input port processor (e.g. 850A) will randomly select an output port for the packet. This creates an evenly distributed pattern as described in the cascaded approach. In the second round, an output port processor (e.g. 851A) sends the packet back to its co-located input port processor (i.e. 850A) which will route the packet to its original destination output port. Since each packet is transmitted twice, the throughput of the switch is only 50% the throughput of the switch in FIG. 8A, but the amount of hardware is also reduced to half.

Input/output Port & Methodology

Although input/output ports are external to the TASA switch fabric, the implementation of a port processor is given below to demonstrate the methodology for using the switch in FIG. 8A.

Figure 10:
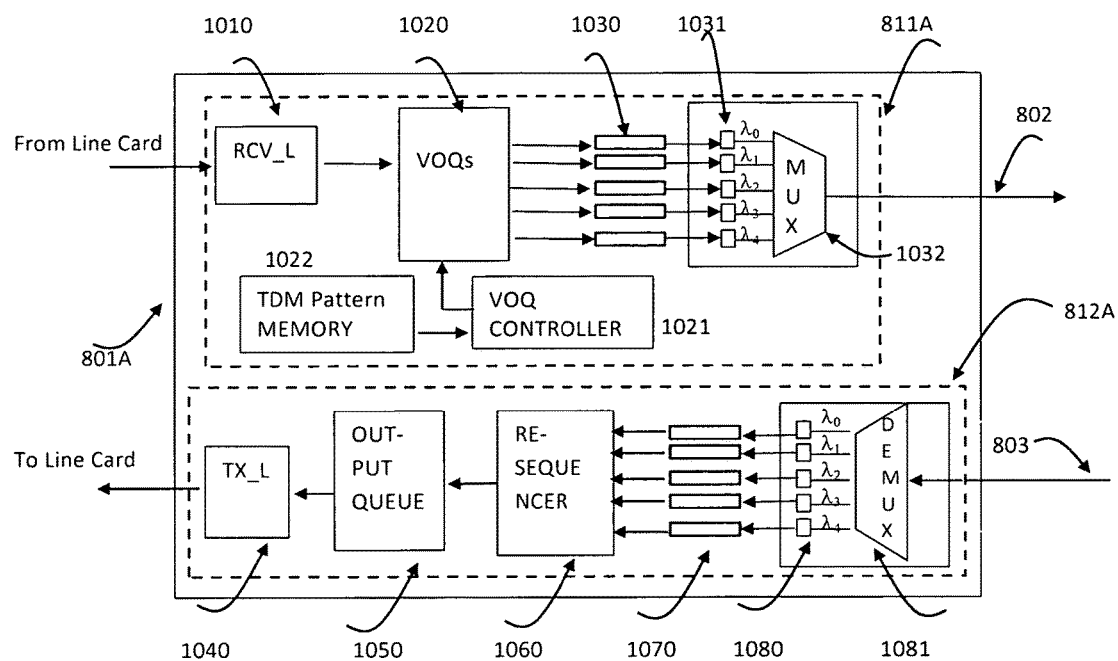
FIG. 10 is an exemplary embodiment of the port processor described in FIG. 8.

FIG. 10 illustrates an exemplary, non-limiting embodiment of input port 811A and output port 811B. Line card receiver 1010 receives an incoming packet from a line card and randomly generate an immediate port number as the output port address (see Output 1 header shown below). The original output port address is kept in the Output 2 header.

| Output 1 (randomly generated) | Output 2 (original destination) | Data |
| --- | --- | --- |

It then puts the packet in a corresponding VOQ (virtual output queue) which is organized based on output ports.

As described in U.S. Pat. No. 9,497,517, the following properties in TASA will hold. (i) All flows of a slice will use different wavelengths, and (ii) two flows destined for the same output port will automatically use two different slices. Thus the VOQ controller 1021 will launch transmissions for all VOQs allowed by the TDM connection patterns. For example, input port processor 0 will launch transmissions for all VOQs shown in 900 in slot 0, all VQOs shown in 910 in slot 1, all VOQs shown in 920 in slot 2, etc (note that FIG. 9A-E represent the TDM connection patterns). The wavelength to be used for each packet in these VOQs can be computed from Eq. 2. Controller 1021 moves the HOL (head of line) packets of these VOQs into corresponding transmission buffers 1030, one for each wavelength. These packets are sent out to fiber 802 through optical transmitters 1031 and multiplexer 1032.

When packets arrive from the TASA fabric through fiber 803, they will be de-multiplexed by Demux 1080 and converted to electronic signals through optical detector array 1081. Since packets can get transmitted out of sequence by randomly selecting the Output 1 address, the re-sequencer 1060 will put packets from each input port into sequence and store them into the output buffer queue 1050 before they are shipped to the line card attached to this port.

Methodologie

Figure 11:
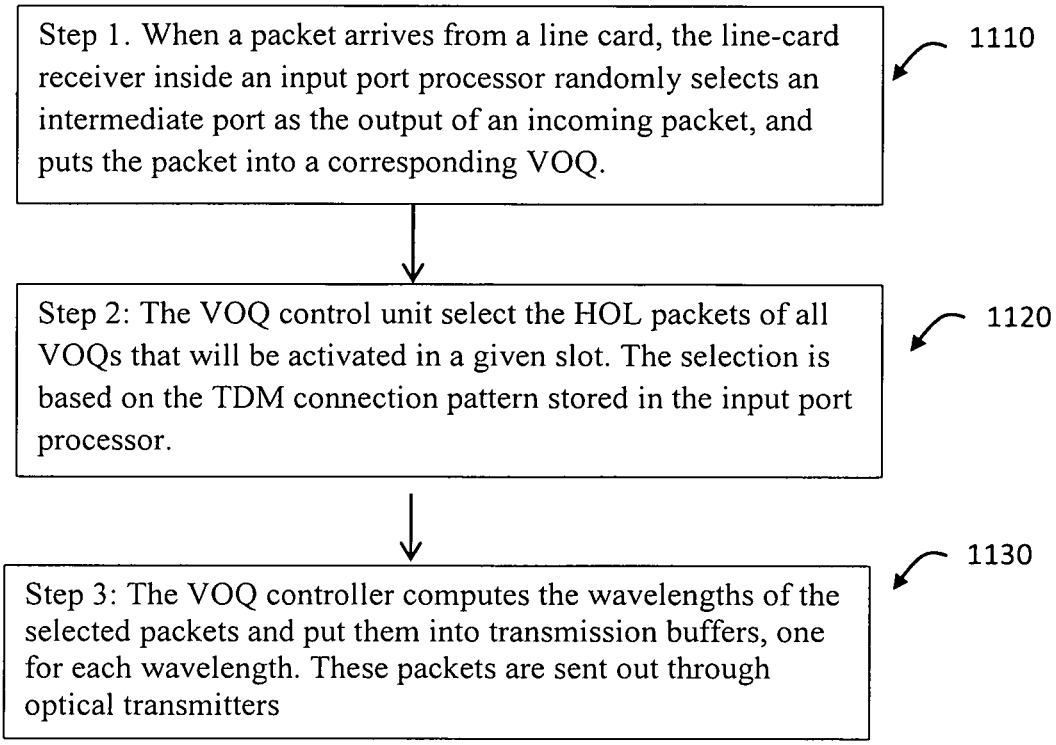
FIG. 11 illustrates how to select VOQs in each input port processor for transmission in each slot.

FIG. 11 presents a diagram illustrating an exemplary, non-limiting embodiment of the steps adopted by each input port processor in the optical switch described in FIG. 10.

Step 1: When a packet arrives from a line card, the line-card receiver 1010 inside an input port processor randomly selects an intermediate port (e.g. 830A) as the output of the incoming packet, and puts the packet into a corresponding VOQ 1020.

Step 2: The VOQ control unit 1021 select the HOL (head of line) packets of all VOQs that will be activated in a given slot. The selection is based on the TDM connection pattern stored in the input port processor.

Step 3: The VOQ controller computes the wavelengths of the selected packets and put them into transmission buffers 1030, one for each wavelength. These packets are sent out through optical transmitters 1031.

What is claimed is:

1. A switching system comprising:
   (a) a first optical switch fabric which comprises
   a first switching stage comprising m N×N AWGRs, numbered from 0 to m−1, for cyclically routing component wavelengths, each component wavelength carrying a data packet, of first WDM signals received from external processors and sending first routed WDM signals to a second switching stage,
   the second switching stage comprising N m×m optical space switches, numbered from 0 to N−1, operating in a pre-determined TDM (time division multiplexing) mode to switch the first routed WDM signals to a third switching stage, and
   the third switching stage comprising m N×N AWGRs, numbered from 0 to m−1, for cyclically routing component wavelengths of second WDM signals, received from the second switching stage, to a middle port-processor stage;
   (b) the middle port-processor stage which comprises a plurality of port processors; and
   (c) a second optical switch fabric which comprises
   a forth switching stage comprising m N×N AWGRs, numbered from 0 to m−1, for cyclically routing component wavelengths, each component wavelength carrying a data packet, of third WDM signals received from the plurality of port processors of the middle port-processor stage and sending third routed WDM signals to a fifth switching stage, the fifth switching stage comprising N m×m optical space switches, numbered from 0 to N−1, operating in a pre-determined TDM (time division multiplexing) mode to switch the third routed WDM signals to a sixth switching stage, and the sixth switching stage comprising m N×N AWGRs, numbered from 0 to m−1, for cyclically routing component wavelengths of forth WDM signals, received from the fifth switching stage, to output ports of the AWGRs of the sixth switching stage;

wherein an external processor connected to the first optical switch fabric sends a packet to a randomly selected port processor of the middle port-processor stage through the first optical switch fabric, and the selected port processor of the middle port-processor stage sends the packet to its original destination through the second optical switch fabric.

2. The switching system of claim 1, wherein m<N and addresses of input ports of the first optical switch fabric is represented by a two tuple (group, member), $0 \leq group \leq m-1$, $0 \leq member \leq N-1$, group being an AWGR number in the first switching stage of the first optical switch fabric and member being an input port number of said AWGR;

wherein addresses of output ports of the first optical switch fabric is represented by a two tuple (group, member), $0 \leq group \leq m-1$, and $0 \leq member \leq N-1$, group being an AWGR number in the third switching stage of the first optical switch fabric and member being an output port of said AWGR;

wherein an external processor connected to an input port (g1, m1), g1 being a group value and m1 a member value, of the first optical switch fabric uses wavelength w to transmit data packets destined for a randomly selected port processor of the middle port-processor stage connected to an output port (g2, m2), g2 being a group value and m2 a member value, of the first optical switch fabric, and wherein w is computed from $m2 = (m1+2w) \bmod N$.

* * * * *